United States Patent

[11] 3,538,940

| [72] | Inventor | Charles H. Graham<br>Mountain View, California |
|---|---|---|
| [21] | Appl. No. | 668,073 |
| [22] | Filed | Sept. 15, 1967<br>Continuation-in-part of Ser. No.<br>617,145, Feb. 20, 1967, now pending,<br>which is a continuation of Ser. No.<br>515,848, Dec. 23, 1965, abandoned,<br>which is a continuation-in-part of<br>Ser. No. 432,598, Feb. 15, 1965, abandoned |
| [45] | Patented | Nov. 10, 1970 |
| [73] | Assignee | Gra-Tec, Inc.<br>Los Altos, California<br>a corporation of California |

[54] FITTING ASSEMBLY
15 Claims, 5 Drawing Figs.

[52] U.S. Cl. .................................................... 137/271,
251/215
[51] Int. Cl. .............................................. F16k 51/00
[50] Field of Search ........................................ 137/269,
271, 270; 251/151, 215, 315, 317, (Needle Valves Digest)

[56] References Cited
UNITED STATES PATENTS

| 2,021,241 | 11/1935 | Mall ............................ | 285/305X |
| 2,437,723 | 3/1948 | Brant et al. .................... | 251/148X |
| 2,535,016 | 12/1950 | Launder ....................... | 285/305X |
| 2,636,362 | 4/1953 | Dunn ........................... 287/53(TK)UX |
| 2,699,915 | 1/1955 | Goepfrich .................... | 285/403X |
| 2,893,755 | 7/1959 | Flower ......................... | 137/614.03 |
| 2,954,604 | 10/1960 | Ramey ......................... | 285/156X |
| 3,123,337 | 3/1964 | Peras ............................ | 251/347X |
| 3,140,073 | 7/1964 | Finck ............................ | 285/305X |
| 3,154,327 | 10/1964 | Rothschild .................... | 285/305X |
| 3,203,447 | 8/1965 | Bremner et al. .............. | 251/129 |
| 1,901,979 | 3/1933 | Meusy .................. 251/Needle Valves |
| 3,394,726 | 7/1968 | Brice ............................ | 137/269 |

FOREIGN PATENTS

| 902,447 | 8/1962 | Great Britain ................ | 285/305 |
| 910,578 | 11/1962 | Great Britain ................ | 285/321 |

Primary Examiner—M. Cary Nelson
Assistant Examiner—Robert J. Miller
Attorney—Limbach, Limbach & Sutton ABSTRACT: An improved fitting or coupling assembly of the type having a distribution block provided with a number of interconnected bores extending thereinto from respective outer faces of the block for interchangeably receiving a number of fitting members with the latter being releasably locked to the block by respective clips inserted in slots at the corresponding faces of the block. One of the fitting members has means for preventing rotation of the same relative to the block so that a valve stem or other structure can be carried by the one fitting member and maintained against rotation relative to the block as one or more of the other fitting members are permitted to rotate relative to the block. When the valve stem is used, the coupling assembly provides a valve whose fluid flow path extends through a pair of the other fitting members. The assembly further includes an improved locking clip mounted on the block and having means biasing it into its locking position.

Patented Nov. 10, 1970
3,538,940
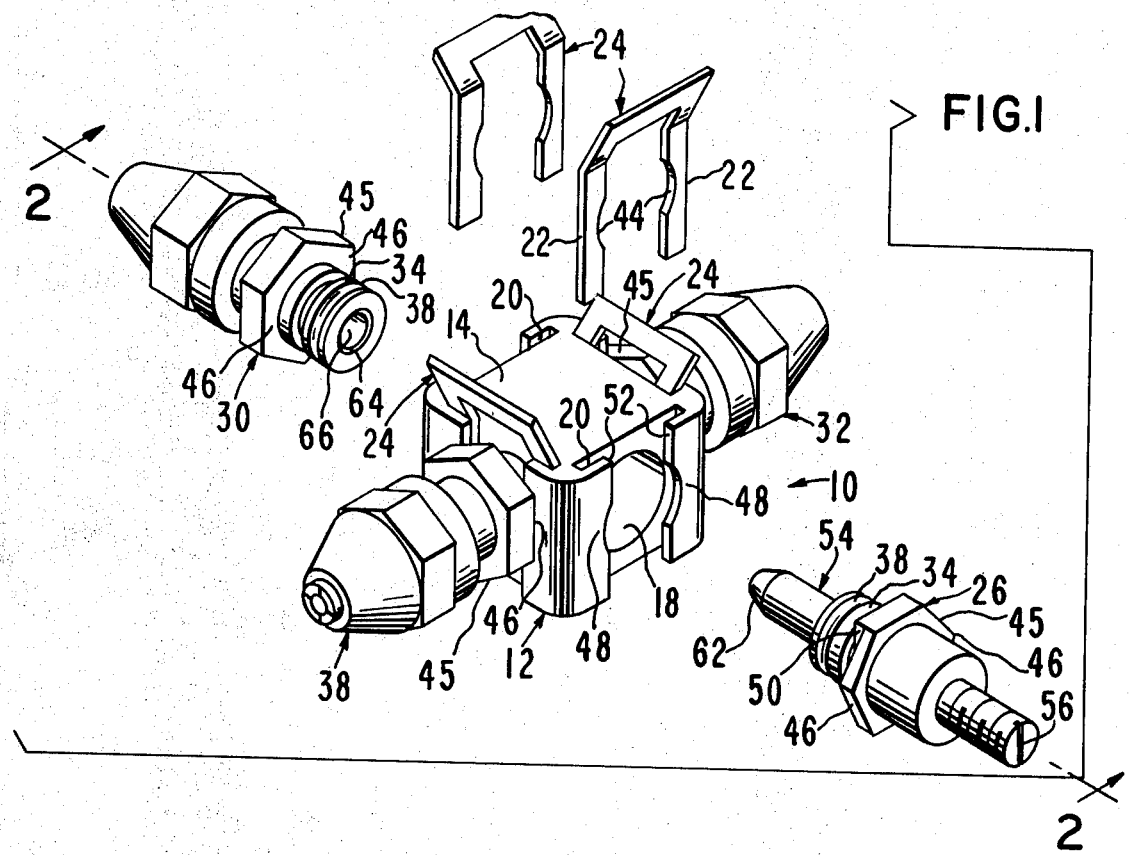
FIG.1
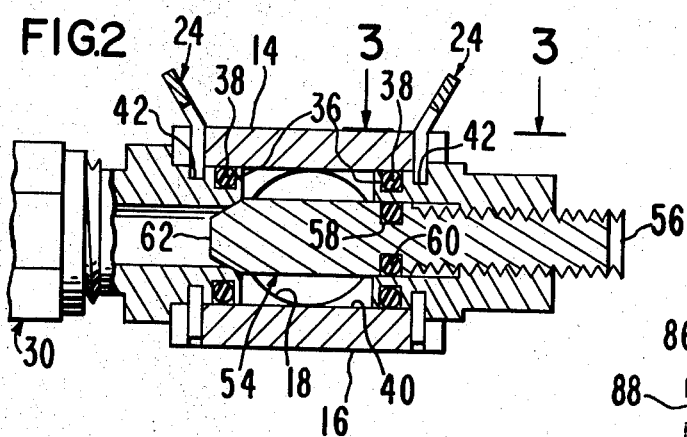
FIG.2
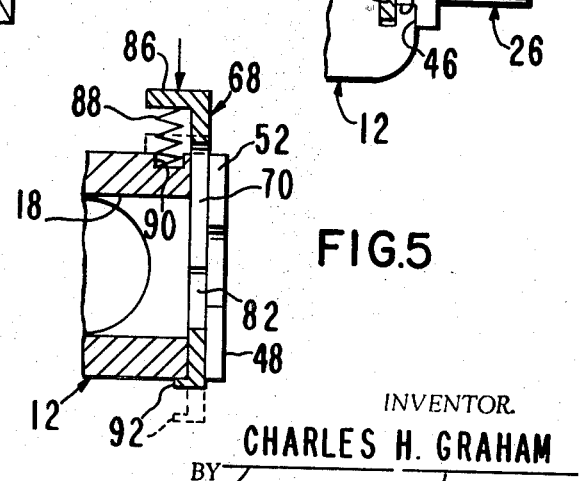
FIG.3
FIG.5
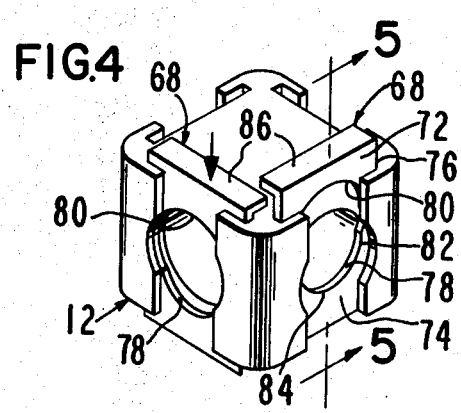
FIG.4
INVENTOR.
CHARLES H. GRAHAM
BY
Townsend and Townsend
ATTORNEYS

FITTING ASSEMBLY

This application is a continuation-in-part of my copending application, U.S. Pat. Ser. No. 617,145, filed Feb. 20, 1967, and entitled "Coupling Assembly" which is a continuation of U.S. Pat. application Ser. No. 515,848, filed on Dec. 23, 1965, now abandoned, and which was a continuation-in-part of application U.S. Pat. Ser. No. 432,598, filed Feb. 15, 1965, now abandoned.

The present invention relates to improvements in fluid flow distribution apparatus, and, more particularly, to a fitting or coupling assembly capable of being arranged in any one of a wide variety of fluid flow distribution configurations using stock parts which are mutually interchangeable.

The structure set forth in the above-mentioned disclosure is directed to a fluid distribution system wherein a coupling assembly of a desired configuration can be quickly and effectively produced from a standard distribution block and from a number of fitting terminations or members selected from a group having a wide variety of configurations to thereby provide a multitude of different fitting combinations for the block. In this way, the distribution system can be constructed in building block fashion from the use of only a relatively few basic components. The distribution block is provided with interconnected, cylindrical, smooth bores extending into the block from respective faces thereof with each face having a slot for shiftably receiving a locking clip. The fitting terminations or members are interchangeably receivable within the bores of the block and have grooves thereon which receive respective clips, whereby the fitting members can be releasably locked to the block. Since the fitting members can be arranged in any manner in the block and selected to perform a specific function, a plurality of different fluid distribution junctions or assemblies can be quickly and easily constructed by the judicious selection of the distribution block and the fitting members.

Many advantages flow from the provision of such an assembly. For instance, the connecting of the fitting members to the blocks can be made in an extremely short time. Also, the way in which the fitting members are mounted on the block avoids the use of threaded couplings and thereby eliminates the problems inherent in any such couplings. Furthermore, since no threaded couplings are utilized, the fitting members can rotate relative to the block without disturbing the sealed connection therewith or the locking action of the clips.

The present invention is directed to improvements to the coupling assembly of the aforesaid disclosure and resides specifically in an improved fitting member and in an improved locking clip. The improvement in the fitting member resides in the fact that it has means thereon cooperable with the block for preventing rotation of the fitting member relative to the block when the fitting member is removably received in any one of the bores of the block and is releasably locked thereto by a clip. This feature allows the fitting member to have other component parts attached thereto which are adapted to be held in fixed operating position relative to the block. For instance, the fitting member may be provided with a valve stem shiftably coupled thereon and movable relative thereto toward and away from a valve seat on the inner end of another fitting member which extends into another bore of the block. Thus, the valve member can be used to adjustably control the fluid flow through the other fitting member yet it will remain properly positioned relative to the block even though other fitting members rotate with respect to the block.

An important aspect of the invention centers around the fact that nonrotative feature of the first-mentioned fitting member can be realized with a standard distribution block with no structural modification thereto. Moreover, this feature can be realized with the fitting member being only a slightly modified form of a standard fitting member. Generally, fitting members have shoulders which engage respective outer faces of the block to limit inward travel of the fitting members within corresponding bores of the block. By reducing the thickness of the shoulders and slightly relocating the same along a standard fitting member, a pair of spaced surfaces will be formed on opposite sides of the fitting member which can be juxtaposed with spaced marginal edge surfaces defined by the configuration of the slot at each face of the block. Thus, the juxtaposed surfaces prevent any rotational movement of the fitting member relative to the block when the fitting member is properly positioned in one of the bores of the block.

Other component parts can be attached to the first-mentioned fitting member where such parts are to be held against rotation relative to the block. For example, a gauge can be utilized in place of the valve stem or can be mounted on a second fitting having means for preventing rotation relative to the block while the valve stem can remain on the first-mentioned fitting member.

Another aspect of the present invention is the provision of an improved locking clip for the distribution block wherein the clip is shiftably mounted on the block and movable toward and away from a position releasably locking a fitting member to the block. Means is provided to bias the clip toward its locking position so that it need only be moved a short distance relative to the block and against the bias force to permit a fitting member to be readily connected or disconnected to the block. Since the clip is mounted, at all times on the block, it cannot become physically separated from the block and misplaced and is at all times ready to lock a fitting member to the block.

The primary object of the present invention is, therefore, to provide improvements in a coupling assembly of the type having a distribution block and a number of fitting members interchangeably received within a number of bores extending inwardly from respective outer faces of the block wherein one of the fitting members has means thereon cooperable with the block to prevent relative rotation between the fitting member and the block so that structure which must normally be held against rotation relative to the block can be releasably coupled thereto by the fitting member and held against rotation even through other fitting members coupled to the block are rotatable relative to the latter.

Another object of this invention is to provide a coupling assembly of the type described wherein the distribution block can be of standard construction and the fitting member can be only slightly modified over standard fitting members to provide the nonrotative feature thereof so that the invention can have essentially all of the advantages of standard coupling assemblies of this type.

A further object of this invention is to provide a coupling assembly of the aforesaid character wherein the fitting member is interchangeably receivable within anyone of a number of bores extending into the distribution block and will be held against rotation regardless of the side of the block on which the same is mounted so that the coupling assembly can be constructed with the fitting members arranged in a wide variety of configurations to thereby allow the coupling assembly to be assembled and disassembled in building block fashion.

Another object of this invention is to provide a coupling assembly having a distribution block and a fitting member coupled to the block and held against rotation relative thereto wherein a valve stem is shiftably mounted on the fitting member and movable toward and away from a valve seat on another fitting member coupled to the block, whereby the coupling assembly provides a fluid valve for controlling the fluid flow through the other member, while, at the same time, the fitting members are interchangeably receivable in any one of the bores of the block itself to permit the valve to have any one of a variety of configurations.

Still a further object of the invention is to provide a coupling assembly of the type described wherein the distribution block has a slot at the entrance of each bore thereof and a locking clip mounted in one of the slots with the clip having means for biasing it into a locking position extending at least partially across the corresponding bore so that the clip will be effectively disposed in the groove of a fitting member when the latter extends into the bore and the clip can readily be moved out of the position when it is desired to rearrange the fitting members even though the clip remains mounted on the block and is not separated therefrom.

Other objects of this invention will become apparent as the following specification progresses, reference being had to the accompanying drawing for a preferred embodiment of the invention.

In the drawings:

FIG. 1 is an exploded, perspective view of the coupling assembly of the invention;

FIG. 2 is a cross-sectional view taken along line 2–2 of FIG. 1 with the parts of the assembly being connected together;

FIG. 3 is a view, partly in section, looking in a direction of line 3–3 of FIG. 2;

FIG. 4 is a perspective view of the distribution block and an improved spring bias clip thereon; and FIG. 5 is a fragmentary, cross-sectional view taken along line 5–5 of FIG. 4.

The coupling assembly forming the subject matter of this invention is broadly denoted by the numeral 10 and includes a distribution block 12 having, for purposes of illustration only, four side faces or sides and a pair of opposed ends 14 and 16 defining the opposed extremities of each side. Each side of the block has a bore 18 which extends into the block and communicates at its inner end with the inner ends of the bores 18 corresponding to the other sides of the block. Each side also has a T-shaped slot 20 at the entrance of the corresponding bore 18 and each slot 20 has a respective bifurcated retainer or locking clip 24 provided with generally parallel legs 22. Clips 24 are adapted to releasably lock fitting terminations or members 26, 28, 30 and 32 to block 12 when the fitting members extend into the four bores 18 of the block.

Block 12 may be made in any suitable manner but it is preferably made by extruding a long bar having the desired crosssection to simultaneously produce the desired number of sides and slots 20. Simple machining operations can be conducted on the block after it has been cut from the bar to form bores 18 with the inner surfaces of the bores being cylindrical and substantially smooth throughout.

Each of the fitting members has an extension 34 which is interchangeably receivable within bores 18, whereby the fitting member can be mounted at any desired location on the block to adapt assembly 10 to a particular use. Extension 34 has a pair of spaced, annular grooves 36 and 42 formed in its outer surface. The normally innermost groove 36 has a resilient O-ring 38 therein for sealingly engaging the cylindrical inner surface 40 (FIG. 2) which defines a particular bore 18. Groove 42 is alignable with a slot 20 when extension 34 is received within the corresponding bore 18 and, when in such alignment, this groove is disposed to receive the legs of a clip 24, whereby the extension and thereby the corresponding fitting member is releasably locked to the block. Legs 22 may have concave portions 44 (FIG. 1) which are complemental to the innermost portion of groove 42, whereby additional locking area may be provided for the clip.

Each fitting member is further provided with a hexagonal projection 45 integral with extension 34 and extending laterally therefrom to define a pair of shoulders 46 for engaging the outer surfaces 48 of a particular side of block 12. Thus, shoulders 46 limit the inward travel of the corresponding extension into a particular bore 18 while projection 45 has tool-engaging flats to facilitate the coupling of additional structure to the corresponding fitting member.

Fitting member 26 has, adjacent to its shoulders 46, a pair of flat surfaces 50 which are disposed at right angles to the shoulders 46 and are disposed for juxtaposition with respective marginal edge surfaces 52 on the corresponding side of block 12 adjacent to surfaces 48 (FIG. 1). When extension 34 is in bore 18 and shoulders 46 engage surfaces 48, surfaces 50 will be in juxtaposition with surfaces 52. Surfaces 50 and 52 thus prevent rotation of fitting member 26 relative to block 12 so that the fitting member can be further coupled to a component part which is to be desirably or necessarily held against rotation relative to the block. Each side of the block has a pair of surfaces 52 so that fitting member 26 can be interchangeably receivable within all bores 18 and still be held against rotation relative to the block. Each pair of surfaces 52 are defined by the particular configuration of the corresponding slot 20 and are formed when the block itself is extruded.

For purposes of illustration, a valve stem 54 is threadably coupled to fitting member 26, extends therethrough, and is movable axially thereof. The outer end of stem 54 has a groove 56 therein for receiving a suitable tool to effect the rotation of the stem relative to the fitting member 26. Stem 54 also has an annular groove 58 therein provided with a resilient O-ring 60 which normally engages the inner surface of extension 34 (FIG. 2) to seal the corresponding junction, yet O-ring 60 allows stem 54 to move axially of extension 34. The innermost end of stem 54 has a conical tip 62 (FIG. 1) for cooperating with a valve seat to be described.

Fitting members 28, 30 and 32 may have any desired configuration. As illustrated in FIGS. 1 and 2, they are all essentially identical in structure but they may be different, if desired. At least a pair of them will be tubular when assembly 10 is used as a fluid valve. Also, for purposes of illustration member 30 is in the bore 18 directly aligned with the bore having fitting member 26. The innermost end of extension 34 of fitting member 30 has a beveled surface 64 defining the above-mentioned valve seat for valve stem 54 whereby fluid flow through the passage 66 of fitting member 30 may be opened to a greater or lesser extent adjusting tip 62 relative to valve seat 64.

An improved clip 68 forming another aspect of this invention is illustrated in FIGS. 4 and 5 and includes a pair of spaced sides 70 interconnected at first proximal ends by a crosspiece 72 and at the opposite end by crosspiece 74. Sides 70 and crosspieces 72 and 74, therefore, define a unitary clip body 76 having a central opening therethrough with the opening having a first arcuate section 78 of a first diameter and a second arcuate section 80 of a second diameter greater than the first diameter. Section 80 is essentially of the same diameter as each bore 18 of block 12. Thus, the side portions 82 at the side marginal edge extremities of opening section 78 may extend partially across the entrance to the corresponding bore 18 and thereby will effectively be received within the groove in an extension 34 when the latter extends into the corresponding bore. The bight portion 84 defining the central peripheral part of section 78 is integral with sides 82 and also is received within the groove of a corresponding extension 34. In this way, clip 68 can be used to releasably lock a fitting member to the block even though the clip remains mounted on the block and need only move a relatively short distance relative thereto to permit release of the fitting member.

Clip 68 has a first lip 86 at one extremity thereof and a coil spring 88 biases lip 86 and thereby clip 68 in a direction to cause portions 82 and 84 to be urged into a position partially across the entrance to a corresponding bore 18. Thus, the clip is biased into its locked position by spring 88. The spring is mounted in any suitable manner, but for purposes of illustration, it is partially received within a recess 90 formed in block 12 and the opposite end of the spring engages the proximal surface of lip 86. A second lip 92 is on the opposite extremity of clip 68 and extends laterally of body 76 so as to engage the opposite end of the distribution block to thereby limit the movement of the clip in the direction of the spring bias force.

In using assembly 10, its configuration is initially established by selecting the particular type of distribution block 12 so that it has the proper number of bores and the correct bore size for the desired fluid flow distribution arrangement. Then, fitting members 26, 28, 30 and 32 are selected so they will fit bores 18 of block 12 and will provide, at least in the case of certain of the fitting members, means by which additional structure can be coupled to the assembly. One or more of the fitting members may be of the plug type for closing off the entrance to a bore.

When the component parts of coupling assembly 10 have been selected, the fitting members are then coupled to block 12 by forcing their extension 34 into respective bores 18 until shoulders 26 engage the outer surfaces 48 of respective sides of the block. Then, clips 24 are inserted if the clips are of the type illustrated in FIG. 1 and FIG. 2. This can be done manually by forcing the clips into slots 20 until the legs of the clips are received in grooves 42 of the fitting members. Then, the conduit or other structure can be coupled to fittings 28, 30 and 32 and valve stem 54 can be manipulated so that it is moved into a desired position for controlling fluid flow through fitting member 30, if the latter is the one aligned with fitting member 26.

If block 12 is provided with a clip 68 for each side respectively, the clips will be on the block so that it is only necessary to depress the clips in the manner shown in FIG. 4 so that section 80 of the central opening of each of the clips becomes aligned with the corresponding bore. When this occurs, a fitting member can be urged into the bore until the corresponding shoulders 46 engage the outer surfaces 48 of the side. Then, the clip can be released, whereupon it will automatically move into the corresponding groove 42 to lock the fitting member to the block.

When used with fitting member 26, coupling assembly 10 provides a fluid-flow valve which is adjustable by shifting valve stem 54 axially of the corresponding bore 18. Thus, the volume rate of flow of fluid entering or leaving fitting member 30 can thereby be controlled to, in turn, control the fluid flow through fitting members 28 and 32 if the latter are tubular and form parts of a fluid flow system.

When the fitting members are properly positioned in respective bores 18, O-rings 38 effectively seal the junctions between the fitting members and the inner surfaces defining the bores to preclude any fluid leakage out of the block past the outer surfaces of extensions 34 even though fitting members 28, 30 and 32 can rotate relative to block 12.

To change the arrangement of the fitting members on the block 12, it is a simple matter to remove clips 24 or shift clips 68 along the sides of the block to unlock the fitting members. Thus, the fitting members can then be separated from the block and rearranged thereon or be replaced by other fitting members. The time involved in removing, rearranging, or replacing a fitting member is of the order of seconds. In this manner, quick connect and disconnect between fitting members and the block 12 are achieved.

While valve stem 54 has been shown as an illustration of a component which is desirably held against rotation relative to the block when it is in a fixed operative condition, it is clear that other component parts requiring such holding action can be used in place of the valve stem. For example, it may be desired to mount a pressure gauge on the block 12 with the pressure gauge disposed in a fixed position so that it will not rotate relative to the block. In this case, the gauge will be coupled to a suitable fitting member such as member 26 in any suitable manner so that the gauge will be immediately placed in fluid communication with the interior of block 12 when the fitting member is inserted in the corresponding bore.

While one embodiment of the invention has been shown and described, it will be apparent that other adaptations and modifications can be made without departing from the true spirit and scope of the invention.

I claim:

1. In a coupling assembly for a fluid flow system: a distribution block having a plurality of faces and provided with a cylindrical bore for each face respectively, the bores extending into the block and being in fluid communication with each other; a fitting member having a cylindrical extension interchangeably slidably receivable within said bores, said extension being provided with means thereon for sealingly engaging the inner surface defining a bore when the extension is received therewithin; and means forming an integral part of each face of said block and integral part of said fitting member for cooperatively holding the fitting member against rotation relative to the block when the extension is received within any one of said bore.

2. In a coupling assembly for a fluid flow system: a distribution block having a plurality of pairs of opposed faces and provided with a cylindrical bore for each face respectively, the bores extending into the block and being in fluid communication with each other, the bores of each pair of opposed faces being aligned with each other; a fitting member having a cylindrical extension interchangeably receivable within said bores and provided with means for sealingly engaging the inner surface defining a bore when the extension is received therewithin; a valve stem shiftably mounted on said fitting member and movable relative thereto axially of the corresponding bore, whereby said valve stem may move toward and away from a fitting member disposed in the bore opposite thereto; and means forming an integral part of each face of said block and an integral part of said fitting member for cooperatively holding the fitting member against rotation relative to the block when the extension is received within any one of said bores.

3. In a coupling assembly for a flow system: a distribution block having a plurality of faces and provided with a cylindrical bore for each face respectively, the bores extending into the block and being in fluid communication with each other; means defining a slot for each face respectively, each slot extending along a respective side and adapted to shiftably mount a locking clip therein; a fitting member having a cylindrical extension interchangeably receivable within said bores, said extension being provided with means thereon for slidably sealingly engaging the inner surface defining a bore when the extension is received therewithin and having groove means alignable with a corresponding slot for receiving a locking clip to thereby cause said fitting member to be releasably locked to the block; and means forming an integral part on said block and an integral part of said fitting member for cooperatively holding the fitting member against rotation relative to the block when the extension is received within any one of said bores and said groove means is aligned with said slot.

4. In a coupling assembly as set forth in claim 3, wherein said holding means includes a first surface on said block for each face thereof respectively and a second surface on said fitting member, said second surface being complemental to said first surface and disposed in juxtaposition therewith when said extension is received within the corresponding bore.

5. In a coupling assembly as set forth in claim 3, wherein each face of the block is provided with a pair of spaced marginal edge surfaces, said fitting member being movable between said surfaces and having a pair of outer surfaces in juxtaposition to and extending along respective marginal edge surfaces of the block when said extension is received within the corresponding bore.

6. In a coupling assembly as set forth in claim 5, wherein said fitting member includes a shoulder engageable with a face of the block to limit the inward travel of the extension within the corresponding bore, at least one of said outer surfaces being flat and being adjacent to the shoulder.

7. In a coupling assembly for a fluid flow system: a distribution block having a plurality of faces and provided with a cylindrical bore for each face respectively, the bores extending into the block and being in fluid communication with each other, a first of said bores being aligned with a second of said bores; means defining a slot for each face respectively, each slot extending along a respective face and adapted to shiftably mount a locking clip therein; a fitting member having a cylindrical extension removably receivable within said first bore and provided with means for sealingly engaging the inner surface defining said first bore when the extension is received therewithin, said extension having groove means alignable with the slot of said first bore for receiving a locking clip to thereby cause said fitting member to be releasably locked to the block; a valve stem shiftably mounted on said fitting member and movable relative thereto toward and away from said second bore, whereby said valve stem may limit the fluid flow through a fitting member disposed in said second bore; and means on said block and said fitting member for holding the latter against rotation relative to the block when the extension is received within said first bore and said groove means is aligned with said slot.

8. In a coupling assembly as set forth in claim 7, wherein at least certain of the bores are of uniform size and are grouped into pairs with the bores of each pair being in alignment with each other, said extension being interchangeably receivable within the bores of said pairs.

9. In a coupling assembly as set forth in claim 8, wherein is included a second fitting member having a passage therethrough and being interchangeably receivable within the bores of said pairs and having a normally innermost end defining a valve seat for said valve stem.

10. In a coupling assembly so set forth in claim 7, wherein said valve stem is threadably coupled to and extends through said fitting member.

11. In a coupling assembly as set forth in claim 10, wherein said valve stem is provided with a resilient O-ring thereon for sealing the junction between said valve stem and said fitting member.

12. In a coupling assembly for a fluid flow system: a distribution block having a plurality of sides and provided with an inwardly extending bore for each side respectively, each bore adapted to receive a fitting member having a clip-receiving groove in the outer surface thereof; means defining a slot for each side respectively, each slot being adjacent to the outer end of the respective bore; a clip shiftably mounted in one of the slots and being movable into and out of the groove of a fitting member when the latter is received within the bore corresponding to said one slot; and means biasing the clip in a direction to cause the same to move into said groove of the fitting member.

13. In a coupling system as set forth in claim 12, wherein said clip has a lip at one end thereof, said bias means including a spring extending between the block and the lip.

14. In a coupling system as set forth in claim 12, wherein said clip is provided with a lip engageable with said block for limiting the movement of the clip in said direction.

15. A coupling assembly for a fluid flow system comprising: a distribution block having a plurality of faces and provided with a bore for each face respectively, the bores extending into the block, being in fluid communication with each other, and being grouped into pairs with the bores of each pair being in generally axial alignment with each other; means defining a clip-receiving slot for each face respectively, each slot extending along a respective face; a fitting member for each bore respectively, the fitting members being interchangeably receivable within the bores, each fitting member having an extension receivable within a bore, each extension having means for sealingly engaging the inner surface defining a bore and provided with groove structure aligned with the corresponding slot when the extension is received within the bore; a clip for each slot respectively, the clips being movable within respective slots into and out of the groove structures of the extensions in the corresponding bores to releasably lock the fitting members to the block, at least one of said clips having means biasing the same into the groove structure of the corresponding extension; a valve stem shiftably mounted on a first of said fitting members for movement toward and away from a second fitting member in the bore aligned with said first fitting member, said second fitting member having a valve seat on the normally innermost end thereof, said valve stem being movable relative to said first fitting member toward and away from said valve seat, said second fitting member and a third fitting member being tubular to provide a fluid passage through said block; and means on said block and said one fitting member for holding the latter against rotation relative to the block when said one fitting member is locked to the block by the corresponding clip.